United States Patent [19]

Weinberg

[11] 4,014,022
[45] Mar. 22, 1977

[54] TARGET DETECTION METHOD AND APPARATUS FOR REDUCING RANGE-SMEARING ERROR CAUSED BY RELATIVE TARGET MOTION

[75] Inventor: Leonard Weinberg, Haddonfield, N.J.

[73] Assignee: The United States of America as represented by the Secretary of the Navy, Washington, D.C.

[22] Filed: June 16, 1975

[21] Appl. No.: 587,475

[52] U.S. Cl. .......................... 343/13 R; 343/5 DP; 343/7 A; 343/8
[51] Int. Cl.² ...................................... G01S 9/06
[58] Field of Search ............... 343/7 A, 5 DP, 13, 8

[56] References Cited
UNITED STATES PATENTS

| | | |
|---|---|---|
| 3,550,125 | 12/1970 | Fierston et al. .................. 343/13 |
| 3,789,396 | 1/1974 | Taylor, Jr. .................... 343/5 DP |
| 3,881,101 | 4/1975 | Pederson et al. ............... 343/5 DP |
| 3,891,987 | 6/1975 | Jensen ......................... 343/5 DP |
| 3,900,850 | 8/1975 | Ulman et al. .................. 343/5 DP |
| 3,905,032 | 9/1975 | Truel et al. ................... 343/5 DP |

*Primary Examiner*—Maynard R. Wilbur
*Assistant Examiner*—S. C. Buczinski
*Attorney, Agent, or Firm*—R. S. Sciascia; P. N. Critchlow

[57] ABSTRACT

Pulse returns received as discrete range samples are averaged, summed with each new range sample and stored individually in cells of a shiftable register. Undesirable range smearing due to relative movement of the target is avoided by aligning each new range sample with the closest of the previously-stored sums. A control signal is generated to represent the estimated relative movement of the target for a particular interpulse period. Alignment is achieved by then shifting the register responsively to the control signal so that the closest stored range sample is summed or integrated with the new, incoming range sample.

5 Claims, 2 Drawing Figures

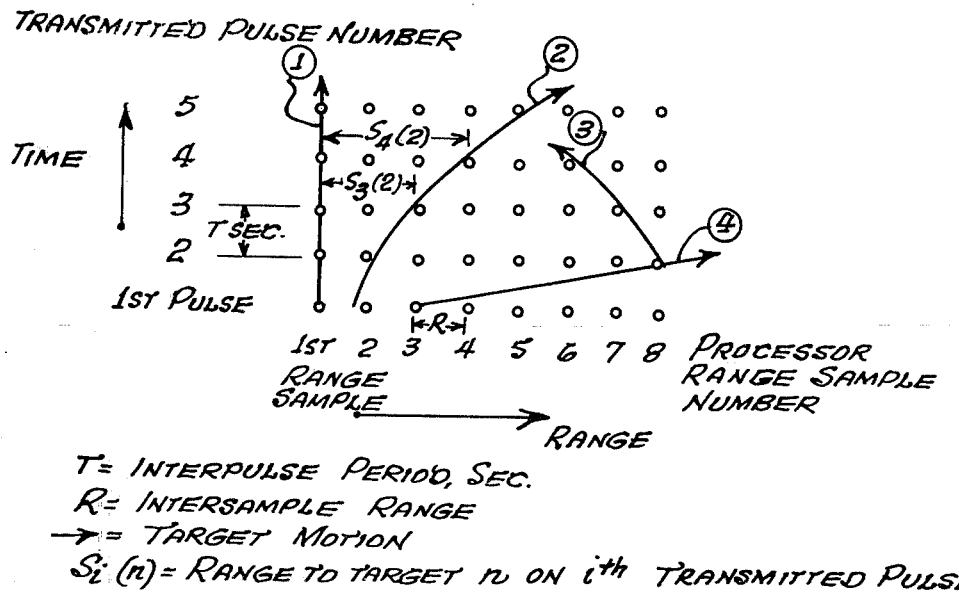
Fig. 1. Showing four target motions and closest range sample integration.
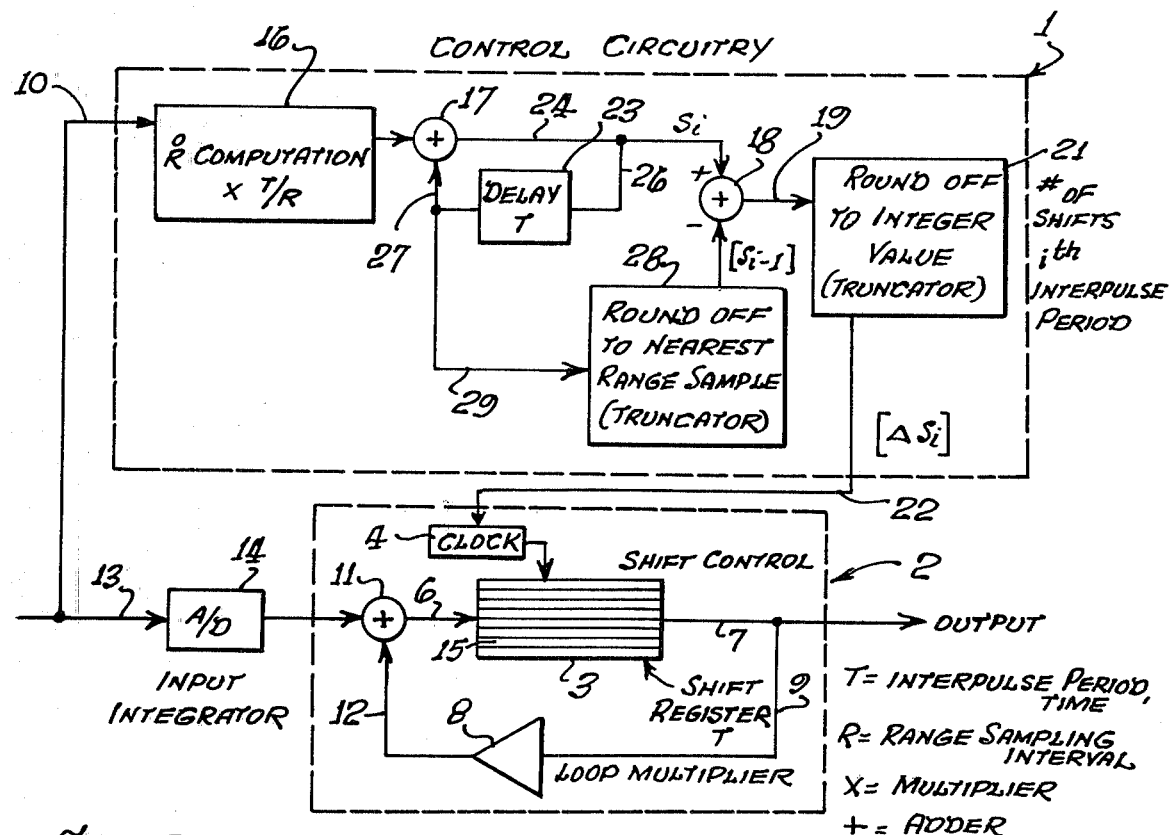
Fig. 2. Closest range sampling integrator and control circuitry.

4,014,022

TARGET DETECTION METHOD AND APPARATUS FOR REDUCING RANGE-SMEARING ERROR CAUSED BY RELATIVE TARGET MOTION

BACKGROUND OF THE INVENTION

The present invention relates generally to radar and communications systems operating on a sampling basis to detect targets in discrete range samples. In particular, it relates to means for improving detection by reducing the so-called 'range-smearing' due to relative movement of the target.

In radar and communications systems it often is necessary to increase the signal level relative to the noise level by combining many pulse returns before a decision can be made as to the presence of a target signal or of a communications signal. With regard to radar systems, there is a further need of estimating the target size once it has been decided that a target signal is present in the radar case. As to communication systems, there is a similar need arising after detection to decide which of several possible signals is present. Many of these systems are 'sampled systems' to the extent that the signals are not available in continuous form but only as discrete range samples. For example, a radar system transmits pulses at predetermined interpulse periods T and a range sample is received for each of the pulse transmissions. Each range sample represents a particular intersample range which can be identified by the letter R.

Many of these systems are complicated by situations in which there is a relative motion between, for example, the target and the radar case, or between the transmitting and receiving antennaes of a communication system. If this relative motion is large or if the pulse-to-pulse integration time is long, a range smearing results. This smearing, as is known, decreases the signal level so as to possibly obscure the signal from detection or, if detected, to materially reduce the ability to estimate the target size. A similar problem occurs in communication systems to the extent that the communication signal becomes more difficult to detect.

The present invention primarily is concerned with providing an effective and relatively simple method and apparatus for reducing the undesirable range smearing and this objective is achieved by integrating closest range samples in a manner adaptive to target motion. The particular manner in which the closest range sample integration is achieved, of course, will be described. In general, a succession of integrated range samples is stored in a shiftable storage register which then is shifted to assure that the closest stored range sample is integrated with each new incoming range sample. The shifting control is provided by a control circuit which estimates on a pulse-to-pulse basis the relative speed of the target. The estimate tells the shiftable register how many range sample shifts are needed to align the new incoming range sample with a previous integrated sum present in the shiftable register so that the register can shift to align that sum for integration with the new incoming signal.

BRIEF DESCRIPTION OF THE DRAWINGS

The present invention is illustrated in the accompanying drawings of which

FIG. 1 is a plot showing the range samples received on successively transmitted pulses, and FIG. 2 is a block diagram circuit of the present system.

DETAILED DESCRIPTION OF THE INVENTION

Referring to FIG. 1, it will be noted that this plot shows the range sample for four different targets identified as targets 1, 2, 3 and 4. Target 4, however, is included primarily to illustrate an exaggerated situation which may be helpful in understanding the operating principle of the present system. As will become apparent, the FIG. 2 implementation of the system is applicable to improving the detection of only one of these targets at a time. If it is desired to track more than one target, the circuitry can be easily multiplexed.

Target 1 of FIG. 1 is a target that has no motion pulse-to-pulse relative to the radar. Consequently, its range samples line up perfectly on successive pulses and can be integrated without any need for shifting for alignment purposes. Target 2, however, has relative motion away from the radar pulse-to-pulse. Also, target 4 is moving away from the radar but with a much higher velocity profile. Target 3, on the other hand, is moving toward the radar as can be seen by the fact that the range sample number reduces as time increases. Target 2, 3 and 4 illustrate the present range smearing problem to the extent that range smearing loss would reduce detectability unless the range samples are delayed or advanced to align range samples pulse-to-pulse.

The present system utilizes what is referred to as a closest sample integration which, in effect, takes the closest range samples to a previous integrated sum, aligns them and integrates. Considering, for example, target 2 of FIG. 1, the following range samples are integrated on successive pulses:

| Pulse No. | 1 | 2 | 3 | 4 | 5 |
|---|---|---|---|---|---|
| Range Sample Integrated | 2 | 2 | 3 | 4 | 5 |

Target 4, as already stated, shows an exaggerated velocity profile in which the need for alignment is very apparent. Thus, as may be noted, during the first interpulse period, the target has moved relatively to a range which includes five range sample shifts. In other words, it has moved five intersample range extents R. To achieve alignment of target 4, range sample 8 should be integrated on pulse 2 with range sample 3 from pulse 1. With regard to target 3 which is moving toward the radar, closest range sample integration for this motion integrates range sample 8 on pulse 2 with range sample 7 on pulse 3 with range sample 6 on pulse 4.

The circuitry for achieving the closest range sample integration is shown in FIG. 2 which, in general, includes two major components 1 and 2 identifiable in the drawing by the dotted line rectangles. Component 1 includes control circuitry the principle function of which is to generate an integer number which, when applied to integrator component 2 tells the integrator how many range samples shifts are needed to align the range samples.

Integrator 2 includes a shift register 3 the shifting of which is controlled by a shift register clock 4. Range samples are fed into the register through an input conductor 6 and taken out of the register through a conductor 7. Output 7 applies the range samples to a subsequent detection stage of the radar or communication system and it also applies the output of the register to a loop multiplier 8 through conductor 9. Loop multiplier 8, in turn, is coupled to a summer or adder 11 by a conductor 12 and, as will be noted, adder 11 sums new range samples arriving on path 13 with the output of loop multiplier 8. An analog to digital (A/D) converter 14 converts the incoming signals to digital form prior to their integration or summation in adder 11. In general, incoming range samples are integrated with the integrated sum of loop multiplier 8 and the new sum is stored in shift register 3. Loop multiplier 8 simply is a multiplier such as can be provided by appropriate operational amplifiers to average a certain number of range samples received from the shift register and, in turn, apply its output to summer 11.

Shift register 3 is illustrated in a particular form simply for descriptive purposes. Any shift register capable of functionally achieving the essential closest range sample alignment can be employed. As shown, register 3 primarily is a storage component formed of a plurality of cells 15, the number of which obviously is optional, although, for consistency with FIG. 1 the register is shown having eight range sample cells. The register shifting movement intended in the FIG. 2 illustration is one in which the eight cells can be moved either upwardly, downwardly or, if desired, in a rotational path so as to permit any particular cell to line up with output 7. The shifting movement of the register is under the control of clock 4 which can assume any conventional form capable of receiving a variable input, such as the integer number inputs derived from control circuitry 1, and, in turn, triggering the desired shifting movement of the register.

As has been indicated, control circuitry 1 functionally generates a number proportional to the number of range sample shifts required to align range samples on successive pulses. For example, considering target 4 of FIG. 1, five range sample shifts are required for alignment. The circuitry includes a range rate computer 16 coupled to an adder 17 and a summer 18, the summer having its output 19 applied to a truncator 21 which, in turn, is coupled over a conductor 22 to clock mechanism 4 of the shift register. Truncator 21, as indicated in its legend, rounds off output 19 of the summer to an integer value so that conductor 22 carries an integer number further identified as $[\Delta S_i]$, the brackets indicating truncation.

Computer 16 is a conventional component capable of estimating the speed to the target. For example, it can be supplied by a conventional tracking radar having an input 10 providing range data from which the target speed relative to the radar or source can be estimated. Multiplication of the estimate by the ratio T/R provides a reliable estimate of the relative speed during each interpulse period. The computer technique for estimating relative speed is well known and rather frequently used. The R computation provided by computer 16 is summed in the digital integration circuit formed by adder or summer 17 and a delay component 23 which as may be noted, delays the output of adder 17 by an interpulse period T. As shown the output of adder 17 is carried by a conductor 24 which has a branch 26 leading to delay 23. The output of delay 23 is applied back to adder 17 through line 27 and also to a truncator 28 through line 29. This arrangement provides what amounts to a two-channel integrator having an upper channel provided by conductor 24. This upper channel carries an integrated range sample sum derived from the so-called '$i^{th}$' pulse. The term $i^{th}$ designates the particular pulse that is being processed on a pulse-to-pulse basis. The lower channel, in turn, which is modified by delay T and rounded off in truncator 28 provides an $[S_{i-1}]$ output. Thus, $S_i$ is the number of range samples to the source on the $i^{th}$ pulse while $[S_{i-1}]$ represents the number of range samples excluding fractional parts to the source on the $(i-1)^{th}$ interpulse. The difference, represented by $\Delta S_i = [S_i - [S_{i-1}]]$ which, as already indicated, is rounded by truncator 21 to the closest integer number of range cells and, as shown, this integer number $[\Delta S_i]$ is applied to integrator 2 through conductor 21. For example, if the differential sampling period $[\Delta S_i]$ is equal to one, this condition manifests the fact that the target has moved further from the radar by one range sample. If $[\Delta S_i]$ is equal to minus one, this manifests the fact that the target is approaching in a manner similar to target 3 of FIG. 1. This control signal $[\Delta S_i]$ serves to vary the clock in the register to align the previous sum stored in integrator loop 8 with a new input such as the radar return resulting from a new pulse transmission. The alignment, as has been described, is achieved by shifting the register so that a particular cell is coupled to the register output. The selected cell, of course, is determined by the $[\Delta S_i]$ control signal which, in effect, is telling the register how many range sample shifts are needed for closest range sample alignment.

In general, the present system seeks to achieve an alignment which compensates for any relative movement. Obviously, since the alignment is based upon estimates, perfect alignment is not expected. However, the use of the closest range sample integration is capable of materially reducing range smearing and, consequently, significantly improving both target detection and estimates of target size as well as decisions regarding which of several targets actually is present. Analysis has shown that closest range sample integration results in a loss of approximately 0.005 dB for 100 pulses integrated and a rectangular power spectrum with a sample rate of 1.5 Nyquist. For a triangular spectrum, the loss is about one half of that for the rectangular power spectrum. As has been indicated, the implementation of FIG. 2 is intended for the tracking of a single target with a particular velocity profile. If several targets are to be tracked, control circuitry 1 can be suitably multiplexed for although, in this instance, more than one integrator circuit, such as integrator 2, may be required.

Obviously many modifications and variations of the present invention are possible in the light of the above teachings. It is therefore to be understood that within the scope of the appended claims the invention may be practiced otherwise than as specifically described.

I claim:

1. For use with a target detection system adapted for integrating and detectably processing a succession of discrete range samples received as pulsed transmissions during a series of interpulse periods T;

a method of reducing range-smearing error produced by pulse-to-pulse motion of the pulse transmission source relative to the detection system, said method including the steps of:

trackably determining the relative speed of said target computing the relative pulse-to-pulse speed of said target, storing in separate cells of a shiftable register a different succession of range sample sums derived by successively adding each of a series of incoming range samples from each range to a sum of previously-received range samples from each range, controllably shifting said register to align a particular range sample sum with each incoming range sample of said particular range, said alignment control being performed on a pulse-to-pulse basis in accordance with said computed pulse-to-pulse target speed to align each incoming range sample with the stored range sample sums within the closest range, summing said incoming range sample with said aligned range sample, and storing said summed incoming range sample in said register for subsequent processing.

2. The method of claim 1 further including the step of:

producing by digital integration of said computed pulse-to-pulse speed an integer number proportional to the number of range samples through which the target moves during each interpulse period, said register shifting being responsive to said integer number.

3. For use with a target detection system adapted to integrate and detectably process a succession of discrete range samples derived from the target and received as pulsed transmissions during a series of interpulse periods;

apparatus for reducing range-smearing error produced by pulse-to-pulse motion of the target relative to the detection system, said motion carrying said target past a certain number of range samples during each interpulse period of said series; said apparatus comprising:

means for determining the relative speed of said target, means for computing the relative pulse-to-pulse speed of the target, means for receiving said computed speed data and generating on a pulse-to-pulse basis an integer number proportional to the number of said range samples passed during each interpulse period, a shiftable register having a plurality of cells for separately storing discrete samples of said different range sample successions, said register further being provided with an output for each of said stored range samples, circuit means coupled to said register output for summing each incoming range sample with a particular one of said stored samples associated with said incoming range, circuit means coupling said summing means to said register for storing said sum in a register cell, control means for shifting said register to permit the delivery of selected stored range samples to said summing means, and means coupling said generated integer number to said control means for shiftably selecting for said summing the stored range sample sum within the closest range to the incoming range sample, said register output also providing a path for delivery of said stored range samples for subsequent processing.

4. The apparatus of claim 3 wherein said means for generating said integer number includes:

computer means for estimating target speed, means for multiplying said estimate by the ratio T/R in which T is the length of an interpulse period and R is the intersample range, said multiplication providing an estimated speed for each interpulse period ($i$), a two-channel digital integration means coupled to said multiplier for producing on a first channel a number representing the total number of range samples to the source of the $i^{th}$ period and on a second channel a number representing the total number of range samples to the source of the ($i^{th} - 1$) period, truncator means for rounding off to the nearest range sample said second channel number, a summer having inputs coupled to both of said channels for producing a number representing the difference in range samples between the $i^{th}$ and the ($i^{th} - 1$) periods which is the number of range sample shifts during an interpulse period, and means for rounding-off said summer output to produce said integer number.

5. The apparatus of claim 3 wherein said circuit means coupling said register to said summer includes:

a loop multiplier means for averaging a predetermined number of range samples.

* * * * *